United States Patent
Chen et al.

(10) Patent No.: US 9,279,990 B2
(45) Date of Patent: Mar. 8, 2016

(54) DISPLAY MODULE

(71) Applicant: WINTEK CORPORATION, Taichung (TW)

(72) Inventors: Chun-Ho Chen, Changhua County (TW); Chung-Lun Li, Taichung (TW); Kun-Chang Ho, Taichung (TW); Wen-Chun Wang, Taichung (TW); Ching-Fu Hsu, Taichung (TW); Chong-Yang Fang, Taichung (TW)

(73) Assignee: WINTEK CORPORATION, Taichung (TW)

( * ) Notice: Subject to any disclaimer, the term of this patent is extended or adjusted under 35 U.S.C. 154(b) by 263 days.

(21) Appl. No.: 14/073,830

(22) Filed: Nov. 6, 2013

(65) Prior Publication Data
US 2014/0139756 A1 May 22, 2014

(30) Foreign Application Priority Data
Nov. 20, 2012 (TW) .............................. 101143235 A

(51) Int. Cl.
| | |
|---|---|
| *G02F 1/1335* | (2006.01) |
| *G02B 27/22* | (2006.01) |
| *G02B 17/02* | (2006.01) |
| *H04N 13/04* | (2006.01) |

(52) U.S. Cl.
CPC .......... *G02B 27/2214* (2013.01); *G02B 17/023* (2013.01); *H04N 13/0409* (2013.01); *H04N 13/0468* (2013.01)

(58) Field of Classification Search
CPC ................. G02F 1/13328; G02F 2001/13312; G06F 3/0412; G06F 3/045; G06F 3/044; G02B 27/26; G02B 27/2214; H04N 13/0404
USPC ....................................... 349/12, 15; 359/466
See application file for complete search history.

(56) References Cited

U.S. PATENT DOCUMENTS

| | | | | |
|---|---|---|---|---|
| 7,414,831 B1 * | 8/2008 | Brown | ................. | G02B 27/144 248/917 |
| 2009/0135280 A1 * | 5/2009 | Johnston | .............. | A61B 1/0005 348/262 |

* cited by examiner

*Primary Examiner* — Mike Qi
(74) *Attorney, Agent, or Firm* — Ming Chow; Sinorica, LLC

(57) ABSTRACT

A display module includes a display device, a pivot member, and a reflection-mirror device. The display device includes a light splitting device and a monitor for displaying first and second images arranged alternately. The light splitting device is disposed at a position corresponding to a light exit side of the monitor for splitting the first and second images along first and second splitting directions respectively. The pivot member is disposed at a side of the display device. The reflection-mirror device is connected to the pivot member to be foldably pivoted to the side of the display device. The reflection-mirror device is for reflecting the first images split along the first splitting direction in a reflection direction when being unfolded relative to the display device. The reflection direction is relatively biased toward the monitor so as to form an included angle cooperatively with a normal of the monitor.

13 Claims, 4 Drawing Sheets

DISPLAY MODULE

BACKGROUND OF THE INVENTION

1. Field of the Invention

The present invention relates to a display module, and more specifically, to a display module utilizing alight splitting device for splitting images displayed by a display device and utilizing a reflection-mirror device to reflect the split images.

2. Description of the Prior Art

With rapid development of image display technology, various kinds of display devices are used wildly in daily life. A display device with two monitors is a representative example. In general, the aforesaid display device utilizes the two monitors to simultaneously display images for generating a wild monitor effect or a split-screen display effect so as to provide a user with a preferable visual feeling or allow multiple users to view the images. However, since the aforesaid display device requires the two monitors (e.g. a liquid crystal display monitor) to work independently for cooperatively displaying images, the manufacturing cost and the overall weight of the aforesaid display device could be increased accordingly.

SUMMARY OF THE INVENTION

The present invention provides a display module. The display module includes a display device, a pivot member, and a reflection-mirror device. The display device includes a monitor and a light splitting device. The monitor is used for displaying a plurality of first images and a plurality of second images arranged alternately. The light splitting device is disposed at a position corresponding to a light exit side of the monitor for splitting the plurality of first images and the plurality of second images along a first splitting direction and a second splitting direction respectively. The pivot member is disposed at a side of the display device. The reflection-mirror device is connected to the pivot member to be foldably pivoted to the side of the display device for reflecting the plurality of first images split along the first splitting direction in a reflection direction when being unfolded relative to the display device. The reflection direction is relatively biased toward the monitor so as to form an included angle cooperatively with a normal of the monitor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
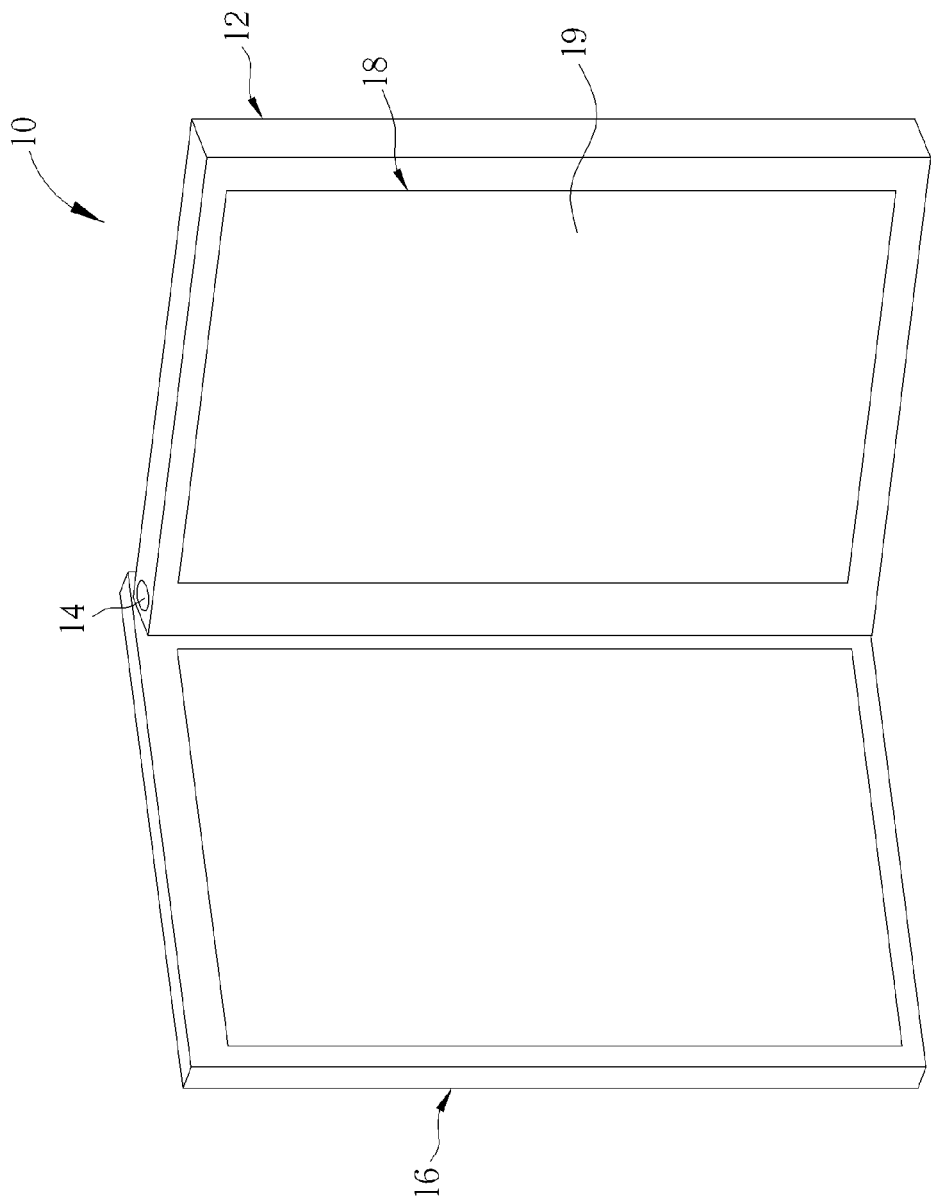
FIG. 1 is a diagram of a display module according to an embodiment of the present invention.

Please refer to FIG. 1, which is a diagram of a display module 10 according to an embodiment of the present invention. The display module 10 could be preferably applied to a foldable electronic device with a display function, such as a tablet computer or a smart phone. As shown in FIG. 1, the display module 10 includes a display device 12, a pivot member 14, and a reflection-mirror device 16. The pivot member 14 is disposed at a side of the display device 12. The pivot member 14 could be preferably a multi-step pivot, so that the display module 10 could have a multi-step angle adjusting function, but not limited thereto, meaning that the pivot member 14 could be other pivot structure commonly seen in the prior art, such as a stepless hinge. The reflection-mirror device 16 is connected to the pivot member 14 to be foldably pivoted to the side of the display device 12, so that the reflection-mirror device 16 could be unfolded relative to the display device 12 to reflect images or be folded upon the display device 12 for a user to carry or store.

Figure 2:
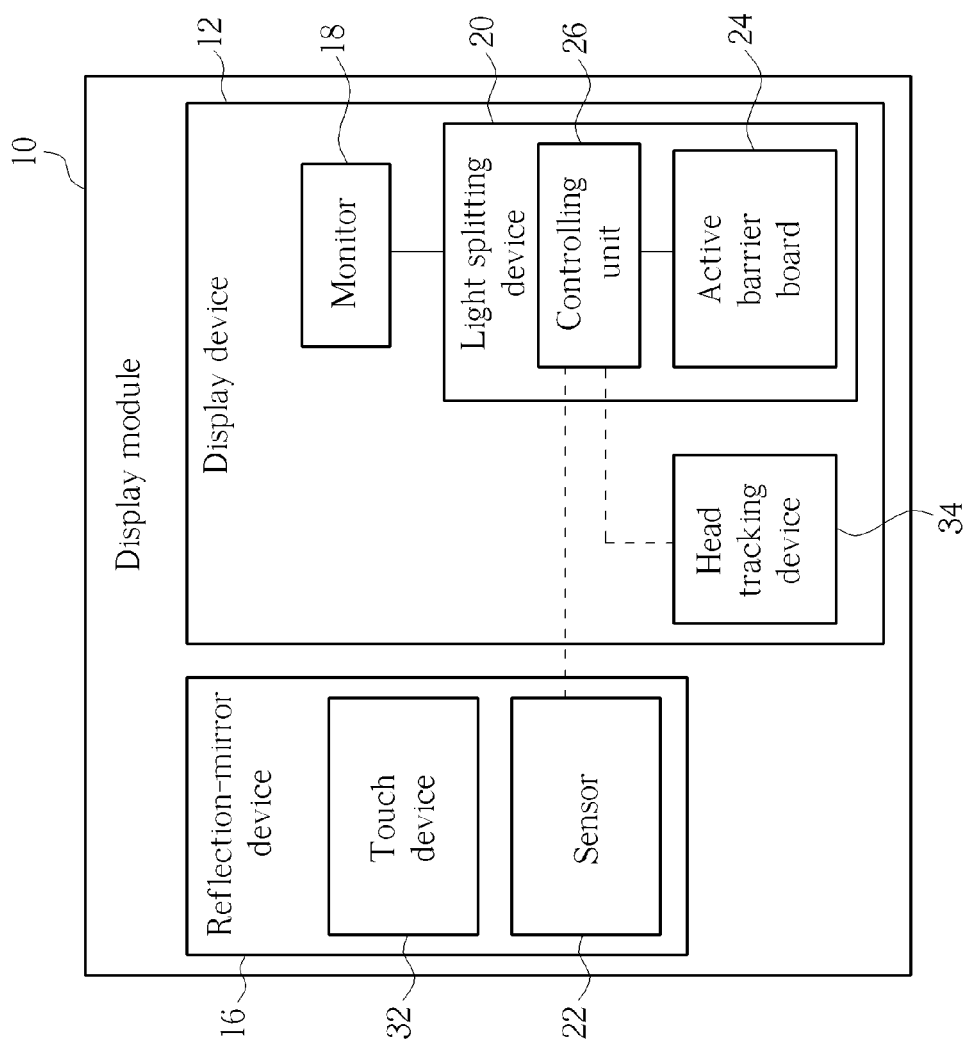
FIG. 2 is a functional block diagram of the display module in FIG. 1.
Figure 3:
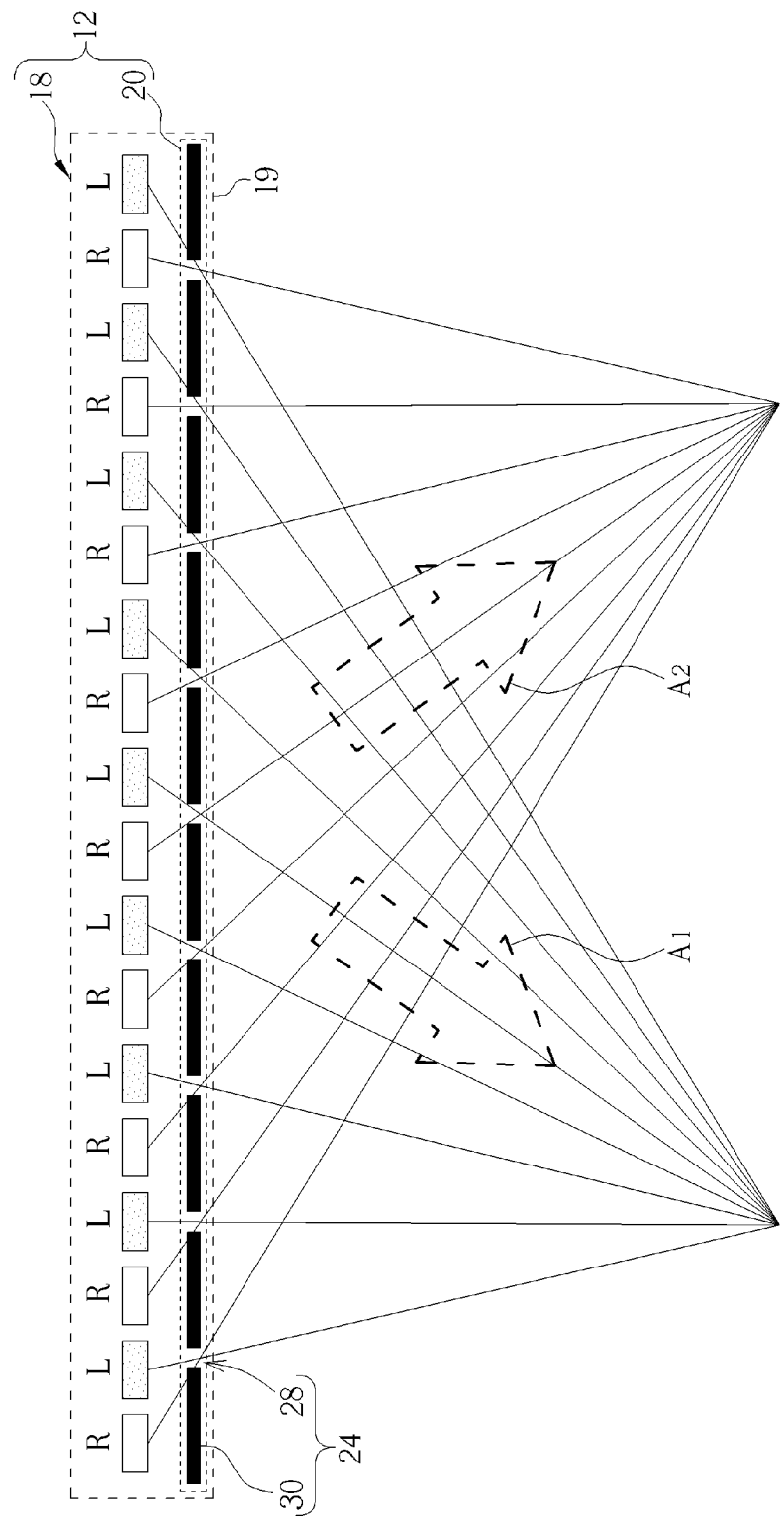
FIG. 3 is a diagram of a display device in FIG. 1 displaying images.

More detailed description for the image displaying design of the display module 10 is provided as follows on premise that the display module 10 is placed upright for displaying images from left to right. As for the related description for the image display design of the display module 10 when the display module 10 is placed flat for displaying images from up to down, it could be reasoned according to the following embodiment and therefore omitted herein. Please refer to FIG. 2 and FIG. 3. FIG. 2 is a functional block diagram of the display module 10 in FIG. 1. FIG. 3 is a diagram of the display device 12 in FIG. 1 displaying images. As shown in FIG. 2 and FIG. 3, the display device 12 includes a monitor 18 and a light splitting device 20, which are depicted by dotted lines in FIG. 3. The monitor 18 could be a liquid crystal display device (but not limited thereto) for displaying a plurality of first images L and a plurality of second images R, which are arranged alternately. The first images L could be preferably reversed to the second images R (but not limited thereto) so as to make the first images L coincide with the second images R after the first images L are reflected by the reflection-mirror device 16. The light splitting device 20 is disposed at a position corresponding to a light exit side 19 of the monitor 18 (as shown in FIG. 3) for splitting the plurality of first images L and the plurality of second images R along a first splitting direction A1 and a second splitting direction A2 respectively.

Figure 4:
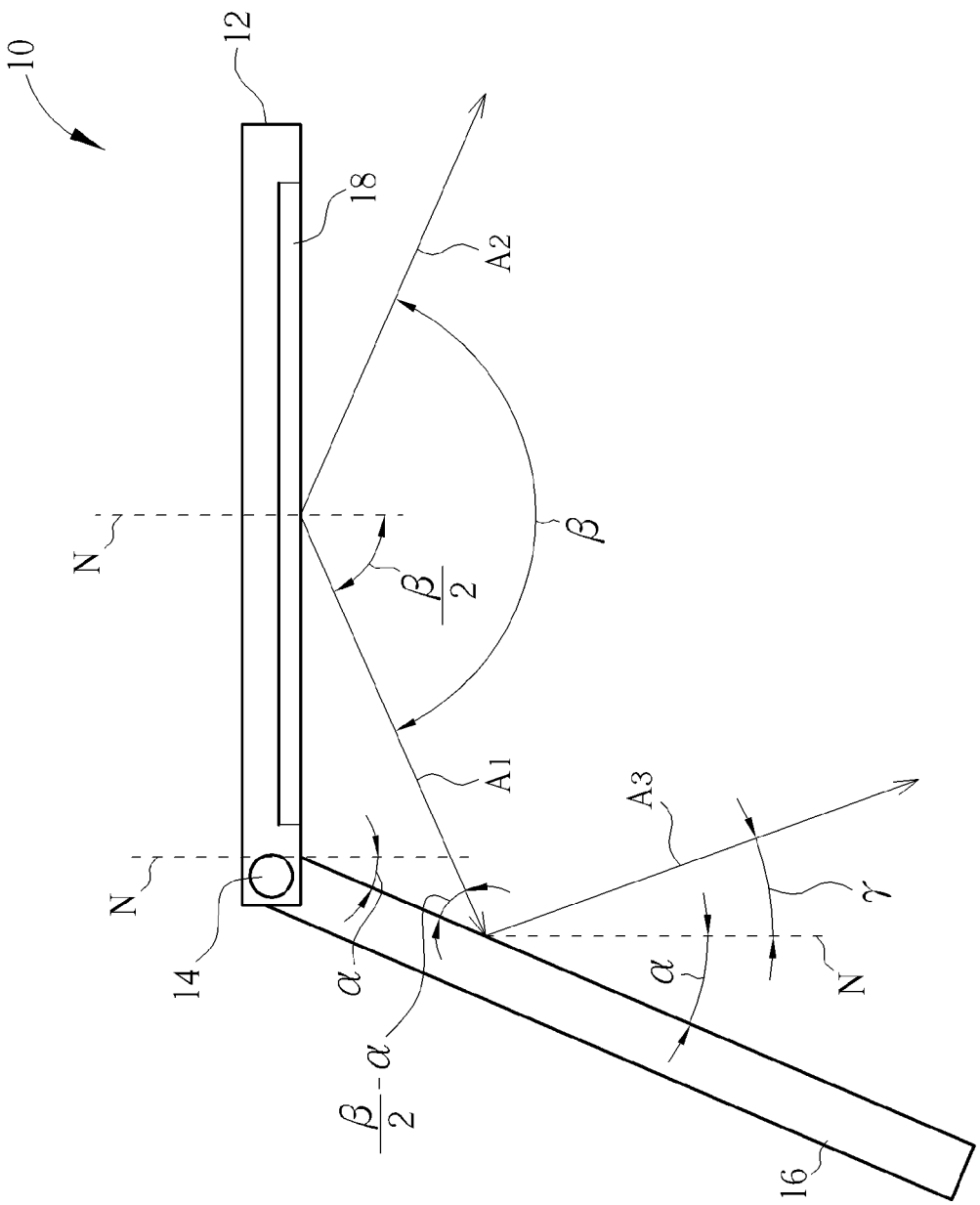
FIG. 4 is a diagram of a plurality of first images in FIG. 3 being projected to a reflection-mirror device along a first splitting direction and a plurality of second images in FIG. 3 being projected along a second splitting direction.

In this embodiment, the light splitting device 20 could utilize a barrier design to achieve the light splitting purpose. For example, please refer to FIG. 2, FIG. 3 and FIG. 4. FIG. 4 is a diagram of the plurality of first images L in FIG. 3 being projected to the reflection-mirror device 16 along the first splitting direction A1 and the plurality of second images R in FIG. 3 being projected along the second splitting direction A2. As shown in FIG. 2, FIG. 3, and FIG. 4, the display module 10 could include a sensor 22, and the light splitting device 20 could include an active barrier board 24 and a controlling unit 26.

The sensor 22 is disposed on the reflection-mirror device 16 and electrically connected to the controlling unit 26 for detecting an included angle α formed by the reflection-mirror device 16 and a normal N of the monitor 18. The sensor 22 could be a conventional angle detecting device, such as an accelerometer, and the related description for the angle detecting design of the sensor 22 is omitted herein since it is commonly seen in the prior art. The active barrier board 24 is disposed at a position corresponding to the light exit side 19 of the monitor 18 and has a plurality of slits 28 and a plurality of barriers 30, which are arranged alternately. Accordingly, via the aforesaid barrier design, the plurality of first images L and the plurality of second images R could be projected along the splitting direction A1 and the second splitting direction A2 respectively via the plurality of slits 28 so as to achieve the light splitting purpose. The controlling unit 26 is electrically connected to the active barrier board 24 for controlling relationship of the plurality of slits 28 and the plurality of barriers 30 according to the included angle α detected by the sensor 22, so as to adjust a light splitting angle β formed by the first splitting direction A1 and the second splitting direction A2. Furthermore, as shown in FIG. 4, the reflection-mirror device 16 could be used for reflecting the plurality of first images L projected along the first splitting direction A1 when the display device 12 is in an unfolded state, so as to make the first images L projected along a reflection direction A3. As shown in FIG. 4, a biased angle γ is formed by the reflection direction A3 and the normal N of the monitor 18 and is equal to (β/2−2*α).

In such a manner, when the monitor 18 displays the plurality of first images L and the plurality of second images R, the plurality of first images L could be projected to the reflection-mirror device 18 along the first splitting direction A1 via the plurality of slits 28 and the plurality of second images R could be viewed by a user along the second splitting direction A2 via the plurality of slits 28. Subsequently, the first images L could be reflected by the reflection-mirror device 16, and then be viewed by the user along the reflection direction A3 as shown in FIG. 4. Finally, after the user views the second images R projected along the second splitting direction A2 and the first images L projected along the reflection direction A3, the display module 10 could allow the user to view the second images R on the monitor 18 and the first images L on the reflection-mirror device 16, so as to provide the user with a visual feeling of viewing images on a display device with two monitors.

To be noted, the biased angle γ formed by the reflection direction A3 and the normal N could be greater than 0 to make the reflection direction A3 relatively biased toward the monitor 18, so as to ensure that the user could view the first images L reflected by the reflection-mirror device 16. That is, relationship of the light splitting angle β and the included angle α could be represented by the following inequality.

$$\gamma=(\beta/2-2*\alpha)>0$$

In practical application, the light splitting angle β could be preferably within a range from 45° to 65°. Accordingly, the included angle α could be within a range from 11.25° to 16.25° according to the aforesaid inequality, and be preferably within a range from 13° to 14°. In such a manner, when the user unfolds the reflection-mirror device 16 relative to the display device 12, the controlling unit 26 could control the relationship of the plurality of slits 28 and the plurality of barriers 30 according to the included angle α detected by the sensor 22 and the aforesaid inequality for adjusting the light splitting angle β, so as to make the relationship of the light splitting angle β and the included angle α conform to the inequality. Accordingly, the reflection direction A3 could be surely biased toward the monitor 18, so as to ensure that the user could view the first images L reflected by the reflection-mirror device 16. In summary, via the aforesaid design that the controlling unit 26 actively controls the relationship of the slits 28 and the barriers 30, the present invention could allow the user to conveniently view the second images R on the monitor 18 and the first images L on the reflection-mirror device 16 without manually adjusting the unfolded angle of the reflection-mirror device 16 relative to the display device 12 after unfolding the reflection-mirror device 16 relative to the display device 12. Accordingly, the operational convenience of the display module 10 could be further enhanced.

The aforesaid design of controlling the relationship of the plurality of slits 28 and the plurality of barriers 30 is commonly seen in the prior art. In other words, all designs of utilizing a controlling unit to control relationship of a plurality of slits and a plurality of barriers on an active barrier board could be utilized by the present invention. For example, the active barrier board 24 could include a plurality of liquid crystal units (not shown in figures). In such a manner, the control unit 26 could control transparency of the plurality of liquid crystal units to form the plurality of slits 28 and the plurality of barriers 30 arranged alternately on the active barrier board 24, and then control the relationship of the plurality of slits 28 and the plurality of barriers 30 (e.g. adjusting a width ratio of the plurality of slits 28 and the plurality of barriers 30 or a position of each slit 28 relative to the corresponding barrier 30) according to the included angle α detected by the sensor 22.

Furthermore, the display module 10 could also utilize the aforesaid design to have a stereoscopic image display function. In brief, assuming that the first images L are left eye images for a user's left eye and the second images R are right eye images for the user's right eye, the display module 10 could utilize the controlling unit 26 to properly adjust the relationship of the slits 28 and the barriers 30 to reduce the light splitting angle β, so as to make the first images L projected to the user's left eye and the second images R projected to the user's right eye. Accordingly, the first images L and the second images R received by the two eyes of the user could be matched as stereoscopic images that have focal range and gradation according to a discrepancy between visual angles of the two eyes, so as to provide the user with a 3D visual feeling.

Furthermore, as shown in FIG. 2, the display module 10 could further include a touch device 32 and a head tracking device 34. The touch device 32 is disposed on at least one of the reflection-mirror device 16 and the monitor 18 to make the display module 10 have a touch function, so as to improve the operational convenience of the display module 10. For example, in the embodiment that the touch device 32 is disposed on the reflection-mirror device 16 and the first images L are keyboard images, the display module 10 could further make the user view a keyboard image on the reflection-mirror device 16, so that the user could perform a keyboard typing operation on the reflection-mirror device 16. As for the other derived touch application, such as disposing the touch device 32 on the monitor 18 with the design that the second images R are keyboard images, it could be reasoned according to the aforesaid example and the related description is omitted herein.

The head tracking device 34 is disposed on the display device 12 and electrically connected to the controlling unit 26. The head tracking device 34 is used for detecting a viewing angle of the user relative to monitor 18. The tracking method utilized by the head tracking device 34 is commonly seen in the prior art and the related description is omitted herein. After the head tracking device 34 detects the viewing angle of the user relative to the monitor 18, the controlling unit 26 could further control the relationship of the slits 28 and barriers 30 according to the viewing angle for adjusting the light splitting angle β. Accordingly, via the aforesaid design that the controlling unit 26 could actively adjusts the light splitting angle β according to the viewing angle detected by the head tracking device 34, the user could still view the correct images even if the viewing angle is changed during the user views the images displayed by the display module 10. In such a manner, the present invention could achieve the purpose that the user could view the correct images at different viewing angles.

It should be mentioned that the design of the light splitting device is not limited to the aforesaid embodiment. That is, the light splitting device utilized by the present invention could also be a fixed barrier board with fixed relationship of slits and barriers formed thereon, a directional backlight device, or a lenticular lens device. For example, in the embodiment that the light splitting device is a fixed barrier board, the user needs to manually adjust the included angle formed by the reflection-mirror device 16 and the normal N of the monitor 18 to make the first images L correctly projected to a position corresponding to the user. As for which light splitting design is utilized, it depends on the practical application of the display module 10.

Compared with the prior art, the present invention utilizes the light splitting device to split the images displayed by the display device and utilizes the reflection-mirror device to reflect the split images to allow the user to view the images on the monitor and the reflection-mirror device respectively, so as to provide the user with a visual feeling of viewing images via a display device with two monitors. In such a manner, the present invention could further reduce the manufacturing cost and the overall weight of the display module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display module comprising:
    a display device comprising:
        a monitor for displaying a plurality of first images and a plurality of second images arranged alternately; and
        a light splitting device disposed at a position corresponding to a light exit side of the monitor for splitting the plurality of first images and the plurality of second images along a first splitting direction and a second splitting direction respectively;
    a pivot member disposed at a side of the display device; and
    a reflection-mirror device connected to the pivot member to be foldably pivoted to the side of the display device for reflecting the plurality of first images split along the first splitting direction in a reflection direction when being unfolded relative to the display device, the reflection direction being relatively biased toward the monitor so as to form an included angle cooperatively with a normal of the monitor.

2. The display module of claim 1, wherein the display module further comprises a sensor, the light splitting device comprises an active barrier board and a controlling unit, the sensor is disposed on the reflection-mirror device and electrically connected to the controlling unit for detecting the included angle between the reflection-mirror device and the normal of the monitor, the active barrier board is disposed at a position corresponding to the light exit side of the monitor and has a plurality of slits and a plurality of barriers arranged alternately, the plurality of first images and the plurality of second images are projected along the first splitting direction and the second splitting direction respectively via the plurality of slits, and the controlling unit is electrically connected to the active barrier board for controlling relationship of the plurality of slits and the plurality of barriers according to the included angle detected by the sensor so as to adjust a light splitting angle formed by the first splitting direction and the second splitting direction.

3. The display module of claim 2, wherein the active barrier board comprises a plurality of liquid crystal units, and the controlling unit is used for forming the plurality of slits and the plurality of barriers on the active barrier board and then adjusting the relationship of the plurality of slits and the plurality of barriers by controlling transparency of the plurality of liquid crystal units.

4. The display module of claim 3, wherein the controlling unit is used for adjusting a width ratio of the plurality of slits and the plurality of barriers according to the included angle.

5. The display module of claim 2, wherein the controlling unit is used for adjusting the relationship of the plurality of slits and the plurality of barriers so as to make the plurality of first images and the plurality of second images to cooperatively form a stereoscopic image.

6. The display module of claim 2 further comprising:
    a head tracking device disposed on the display device and electrically connected to the controlling unit for detecting a viewing angle of a user relative to the monitor, the controlling unit being used for controlling the relationship of the plurality of slits and the plurality of barriers so as to adjust the light splitting angle formed by the first splitting direction and the second splitting direction.

7. The display module of claim 1, wherein relationship of the light splitting angle formed by the first splitting direction and the second splitting direction and the included angle is represented by the following inequality:

$$(\text{the light splitting angle})/2 - (\text{the included angle})*2 > 0.$$

8. The display module of claim 7, wherein the light splitting angle is within a range from 45° to 65°, and the included angle is within a range from 11.25° to 16.25°.

9. The display module of claim 8, wherein the included angle is within a range from 13° to 14°.

10. The display module of claim 1, wherein the light splitting device is a fixed barrier board, a directional backlight device, or a lenticular lens device.

11. The display module of claim 1, wherein the pivot member is a multi-step pivot.

12. The display module of claim 1, wherein the plurality of first images is reversed to the plurality of second images.

13. The display module of claim 1 further comprising:
    a touch device disposed on at least one of the reflection-mirror device and the monitor.

* * * * *